(12) United States Patent
Vasseur

(10) Patent No.: US 9,293,967 B2
(45) Date of Patent: Mar. 22, 2016

(54) DEVICE FOR GUIDING AIR IN A SUCTION SYSTEM FOR A ROTARY ELECTRICAL MACHINE

(75) Inventor: Patrice Vasseur, Pernois (FR)

(73) Assignee: MERSEN FRANCE AMIENS SAS, Amiens (FR)

( * ) Notice: Subject to any disclaimer, the term of this patent is extended or adjusted under 35 U.S.C. 154(b) by 682 days.

(21) Appl. No.: 13/576,312

(22) PCT Filed: Jan. 31, 2011

(86) PCT No.: PCT/FR2011/050186
§ 371 (c)(1),
(2), (4) Date: Sep. 4, 2012

(87) PCT Pub. No.: WO2011/092441
PCT Pub. Date: Aug. 4, 2011

(65) Prior Publication Data
US 2012/0324673 A1    Dec. 27, 2012

(30) Foreign Application Priority Data
Feb. 1, 2010   (FR) ..................................... 10 50674

(51) Int. Cl.
*A47L 5/38*    (2006.01)
*H02K 9/28*    (2006.01)

(52) U.S. Cl.
CPC .... *H02K 9/28* (2013.01); *A47L 5/38* (2013.01)

(58) Field of Classification Search
CPC ......... A47L 5/38; A47L 2201/00; A47L 9/00; A47L 5/14; B08B 15/002; B23Q 11/0046; H02K 9/28

USPC .............. 15/300.1, 301, 345, 256.51; 134/23, 134/110
See application file for complete search history.

(56) References Cited

U.S. PATENT DOCUMENTS

| 3,932,910 A * | 1/1976 | Shimoda ......................... 15/301 |
| 4,459,012 A * | 7/1984 | Allen et al. .................... 399/355 |
| 5,146,279 A * | 9/1992 | Seyfried .......................... 399/93 |
| 6,754,466 B1 * | 6/2004 | Pozniakas ..................... 399/355 |
| 2003/0168083 A1 * | 9/2003 | Jenkins ........................... 134/23 |

FOREIGN PATENT DOCUMENTS

| EP | 1768235 A1 | 3/2007 |
| GB | 1005433 A | 9/1965 |
| WO | 00/69049 A2 | 11/2000 |

OTHER PUBLICATIONS

International Search Report for PCT/FR2011/050186 dated Apr. 18, 2011.

* cited by examiner

*Primary Examiner* — Robert Scruggs
(74) *Attorney, Agent, or Firm* — Sughrue Mion, PLLC

(57) ABSTRACT

The invention relates to a guidance device (10) of a suction system, said suction system being designed to suck up the dust generated by a brush (1) rubbing against a rotary element (2) in a rotary electrical machine, the guidance device (10) being designed in such a way as to concentrate a stream of air (F) generated by the suction system, near the end of the brush that is in contact with the rotary element (2). The guidance device defines at least one suction chamber (12) shaped so that it opens towards the rotary element, said at least one chamber having walls extending in a longitudinal direction so that said assembly is shaped so as to surround part of a brush near said end. The invention also relates to a suction system comprising such a guidance device.

21 Claims, 2 Drawing Sheets

DEVICE FOR GUIDING AIR IN A SUCTION SYSTEM FOR A ROTARY ELECTRICAL MACHINE

CROSS REFERENCE TO RELATED APPLICATIONS

This application is a National Stage of International Application No. PCT/FR2011/050186 filed Jan. 31, 2011, claiming priority based on French Patent Application No. 1050674 filed Feb. 1, 2010, the contents of all of which are incorporated herein by reference in their entirety.

The present invention relates to the area of brush holders and more particularly brush holders for rotary electrical machines.

A brush holder device is an assembly of elements used to hold or maintain in position a brush of a rotary electrical machine, for example a motor or a generator.

A brush, usually made of graphite, makes it possible to ensure the transmission of electrical power between a moving element and a fixed element.

The purpose of the brush holder device is to maintain the brush in contact with the moving surface of the rotary electrical machine, for example a commutator or a ring, while applying a certain pressure to said brush. The pressure is customarily assured by means of an elastic device such as a spring.

Dust is generated as a result of the rubbing of the brush against the moving element. This dust is susceptible to lead to degradation of the surface state of the commutator or the ring and/or mechanical jamming and/or electrical insulation defects.

Document WO 00/69049 describes a suction system for the dust generated by a brush, comprising a collection device situated behind the brush.

The need exists for a more compact device.

The object of the invention is a guidance device for a suction system, the suction system being intended to suck up the dust generated by a brush rubbing against a rotating element of a rotary electrical machine, the guidance device being arranged in such a way as to concentrate a stream of air, generated by the suction system, near the end of the brush that is in contact with the rotating element. The guidance device defines at least one suction chamber configured so that it opens towards the rotating element, said at least one chamber having a wall assembly extending in the same longitudinal direction. Said assembly of walls is configured so as to surround a part of a brush near said end that is in contact with the rotating element.

This guidance device can thus be relatively compact and easy to install.

The one or more said walls extending in the longitudinal direction are described as being vertical in the present application.

Given that the one or more vertical walls surround the brush, for at least one part of its height, the assembly formed by the brush and the guidance device can occupy a relatively limited volume. This assembly can thus be put in place in an installation more easily than the system in the document discussed above.

These vertical walls may be four in number, in particular for a brush having the general form of a block, although it goes without saying that one, two, three walls, five walls or more can be proposed. In the case of a brush with a circular base in particular, it would be advantageous to propose a guidance device having a single circular wall with an internal diameter slightly larger than the external diameter of the base of the brush, so that it fits the brush as closely as possible. In the case of a brush having a hexagonal base, it would be advantageous to propose a guidance device with a hexagonal section, so that it fits the brush as closely as possible. In general terms, it is advantageous for the wall assembly to have a section corresponding to a slight enlargement of the base of the brush, so that it is able to accommodate the brush while remaining relatively close to said brush.

In the case of an assembly of four walls, each of these walls may advantageously be flat and perpendicular to the two walls that are adjacent to it, such that the cross section of the wall assembly is substantially rectangular or even square. The wall assembly may thus be adapted to the brushes having the general form of a block.

The walls may be flat and fixedly joined to one another with or without roundings. The walls may possibly be curved, and they may extend in the same direction in such a way as to form a cylinder.

It will be appreciated that the suction chamber may be defined by a volume that is open on only one of its sides in order to direct the suction flow as effectively as possible.

The expression "a part of a brush near said end that is in contact with the rotating element" is used to denote that the extremities of at least certain of the vertical walls of the suction chamber remain above the end of the brush that is in contact with the rotating element, in order to prevent the guidance device from constituting an obstacle to the passage of the rotating element. However, the guidance device surrounds a part of the brush near the end of the brush that is in contact with the rotating element, allowing in particular the surface of the brush that is in contact with the rotating element to be surrounded as closely as possible and thereby restricting any leakage of dust.

Such a configuration may in particular permit the more effective concentration of the stream of air and the limitation of the dispersion into the air of the dust generated by rubbing between the brush and the moving element.

The expression "near" is used to denote that the device will approach sufficiently closely to the rotating element to limit the dispersion of the dust, yet without coming into contact with the element as it rotates.

According to one particular embodiment, the space between the guidance device and the element as it rotates may lie in the range between 2 and 4 mm.

The guidance device may advantageously consist of at least two vertical walls, one of which extends further than the other from the side of the opening towards the rotating element, such that, when said guidance device is installed around the part of the brush that is in contact with the rotating element, one of said walls remains above the end of the brush that is in contact with the rotating element in such a way as to allow said rotating element to pass when in rotation, and the other of said walls, known as the lateral wall, extends beyond, considered by convention to be below, the end of the brush that is in contact with the rotating element.

This lateral wall or these two lateral walls may thus form a skirt in order to concentrate the dust even more effectively.

For yet more compactness, it is possible to propose that the suction chamber be centered around the brush.

The vertical walls may be relatively close to the sides of the brush.

The end of the brush that is in contact with the rotating element may be only roughly flat. In particular, this end may exhibit a form that is substantially complementary to the form of the rotating element, due to the wear associated with the rubbing.

The guidance device has an opening extending along a longitudinal axis (see, for example, axis X-X in FIGS. 1 and 2) configured to receive the brush and guide the brush in the longitudinal direction defined by this axis. The brush end, which is intended to rub against the rotating element, may be described as being horizontal in opposition to the vertical sides of the brush, which are intended to be surrounded by the chamber for a part of their height. It will be appreciated that the rubbing end may form a non-right angle with said sides that are described as being vertical: for example, it is sufficient for this purpose for the brush to be brought into rubbing contact against a portion of the rotating element that is non perpendicular to the longitudinal direction of the brush, described as being vertical.

More specifically, the guidance device can define two or more suction chambers. A plurality of suction chambers could permit the suction flow to be concentrated more effectively. For example, by dividing the suction chamber into two parts, and by connecting each chamber to a suction flow, each chamber will then have a suction flow that is more concentrated. This plurality of suction chambers may be delimited by the wall assembly surrounding the brush for a part of its height.

The guidance device may advantageously be fixedly joined to a cage surrounding the brush.

The fixed joining of the guidance device to the brush cage may permit the easier positioning of the guidance device in relation to the zone to be aspirated. In addition, the guidance device may also be installed relatively easily on a brush holder that is already in place.

The guidance device may advantageously be realized by over-molding around the cage.

More specifically, the guidance device may be realized in one piece with the cage. This device permits in particular the limitation of the number of pieces, and thus the number of assembly operations, during the installation of such a device on a rotary electrical machine.

The guidance device may advantageously comprise at least one means of connection to a pipe. More specifically, the means of connection assures an airtight connection between the guidance device and the pipe. In particular, the means of connection may be an orifice which passes through the guidance device in order to assure the passage of the stream of air from a suction chamber towards a pipe. The means of connection may also be coupled to an elbow stud. The connection may be assured by screwing or by adhesive bonding, for example.

According to another embodiment, the guidance device may be a device that is capable of maintaining the end of the pipe near the part of the brush that is in contact with the rotating element. By way of example, it is possible to envisage a mounting bracket that is fixedly joined to the cage surrounding the brush. It would then be possible to envisage a tip that is fixedly joined to the end of the pipe, for example by screwing or by adhesive bonding. The tip may then assume various forms in order to distribute the suction flow, such as, for example, a broad tip or other tips of the kind that are utilized with domestic vacuum cleaners.

According to one particular arrangement, the guidance device may comprise at least one pipe for its connection to a suction unit.

A suction unit is a device for generating a suction air flow. This suction unit may be a suction unit of the type used in clean rooms. We do not propose to go any further here into the definition of this device, which is familiar to a person skilled in the art.

More specifically, the one or more suction chambers, the pipe, the connection and/or the tip may be made from an antistatic material or a material covered with an antistatic surface.

The use of an antistatic material prevents the dust from adhering to the internal walls of these elements and thus limits the risks of the obstruction of the latter.

According to one particular embodiment, the pipe is based on antistatic polyurethane.

In particular, the guidance device may be made from a material that is electrically insulating and resistant to the heat generated by the operation of the machine.

The use of an electrically insulating material prevents the formation of electric arcs between the rotating element and the guidance device, which could generate disruptions in the functioning of the machine, in particular by causing damage to the guidance device.

The heat generated by the machine could cause a traditional plastic material to melt, thereby forfeiting the dimensional stability of the guidance device, which stability is necessary due to the proximity of the guidance device and the rotating element.

The material used is advantageously a non-conductive acetal resin having an operating temperature range from −40° C. to more than 110° C.

Also proposed is a dust suction system comprising a suction unit and at least one guidance device of the kind described above.

In particular, the suction unit may be capable of generating an optimum flow in order to aspirate the dust.

It will be appreciated that an insufficient suction flow rate may entail the loss of all or part of the dust and may render the guidance device ineffective. Conversely, an excessively high flow rate may entail the unnecessary expenditure of energy.

Advantageously, it has been determined empirically that the suction flow in the interior of the guidance device could usefully assume values comprised between 10 and 20 $m^3/h$, with an associated rate of flow of between 15 m/s and 40 m/s and preferably 20 m/s.

It will be readily appreciated that the suction flow rate generated by the suction unit is a function of various parameters, including the number of brushes, the dimensions of the guidance device, the desired level of cleanliness, etc.

More specifically, the suction system may comprise a flow diverter, a suction unit and a plurality of guidance devices of the kind described above, the flow diverter assuring the connection and the distribution of the stream of air between the suction unit and the guidance devices. The flow diverter permits the suction flow generated by the suction unit to be divided and may permit the flow to be distributed in an unequal fashion, in particular as a function of the length and the diameter of the pipes.

A further object of the invention is a guidance device for a suction system, said suction system being intended to aspirate dust generated by a brush rubbing against a rotating element in a rotary electrical machine, the guidance device being arranged in such a way as to concentrate a stream of air, generated by the suction system, near the end of the brush that is in contact with the rotating element. The guidance device defines at least one suction chamber configured so that it opens towards the rotating element and surrounds part of a brush near said end that is in contact with the rotating element. The suction chamber may advantageously be centered around the brush.

The invention is now described below with reference to the drawings, which are without limitation, and in which.

Figure 1:
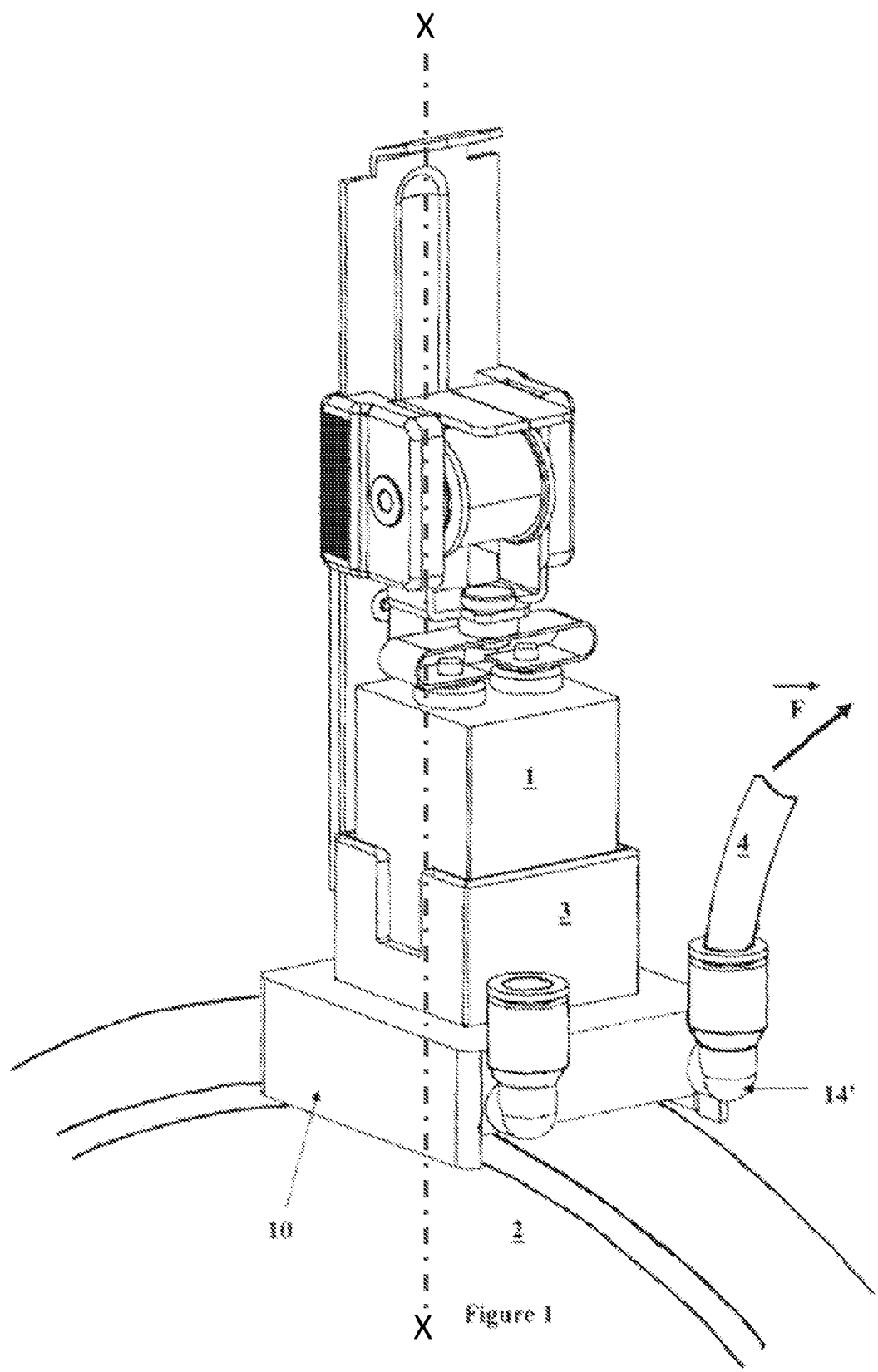
FIG. 1 is an overall perspective view of an integrated guidance device on a brush of a rotary electrical machine according to one embodiment of the invention.
Figure 2:
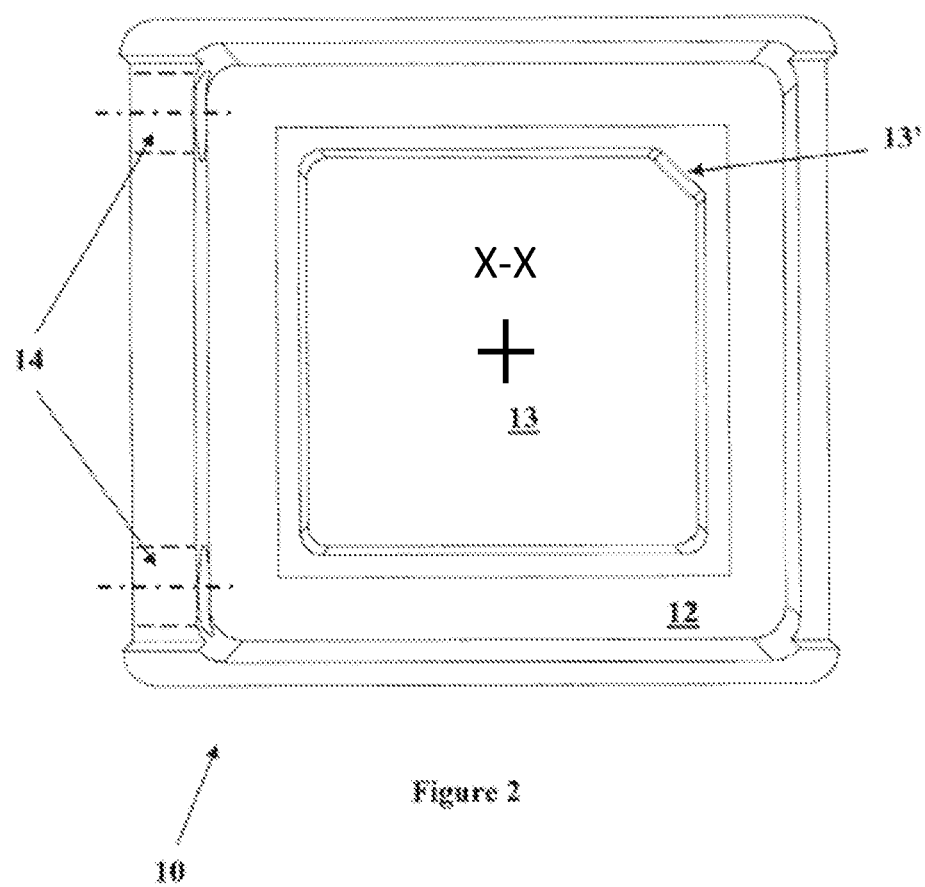
FIG. 2 is a perspective view from below of an example of a guidance device according to the embodiment depicted in FIG. 1.

One particular embodiment of the invention is illustrated in these figures. In particular, the guidance device according to the illustrated example is in the form of a sole 10.

This sole 10 is illustrated as a view from above of a parallelepiped of square form exhibiting at its center an orifice 13. This orifice 13 is intended to permit the passage of a cage 3 capable of holding a brush 1. According to one variant, which is not illustrated here, the orifice 13 may be directly adapted to hold the brush 1 directly.

The orifice 13 exhibits in particular a foolproof device 13' permitting errors in the assembly of the brush 1 on the guidance device 10 to be avoided.

In the illustrated example, the orifice 13 is surrounded by a suction chamber 12 that is open towards the rotating element 2. This suction chamber 12 comprises two orifices 14 passing through the sole 10 in order to assure the passage of the stream of air F from the chamber 12 towards the pipes 4. The fixed joining of the pipes 4 to the sole is assured specifically by an elbow stud 14' bonded into each orifice 14.

The elbow studs 14' are traditional devices that are familiar to a person skilled in the art. They may be made, for example, from metal or from plastic.

The suction chamber 12 is delimited by four vertical walls surrounding a part of the brush 1, two of which are lateral walls situated opposite one another, which extend further towards the rotating element 2 than the two other vertical walls, in such a way as to form a skirt. It is preferable, in effect, for these two other vertical walls not to constitute an obstacle to the passage of the rotating element.

The suction chamber 12 is centered around the brush 1.

The materials used for the sole 10, the means of connection 14' or the pipe 4 are resistant to a temperature in the range from 60° C. to 200° C. and above, and preferably below 80° C.

The materials used are also antistatic or have been treated in such a way that they do not retain the dust in order to limit the accumulation of dust at the level of the various elements and any associated problems relating to the mechanical function.

According to one particular embodiment, the sole 10 is made from polyacetal. Its manufacture could also be envisaged in polyphenylene sulfone, polycarbonate or possibly polyamide, subject to its ability to comply with the following specific requirements:

resistance to traction in the range from 60 MPa to 200 MPa, and preferably at least 70 MPa;
continuous operating temperature in the range from 60° C. to 300° C., and preferably at least greater than 110° C.;
electrical resistance in the range from $1.10^{10}$ Ohm/cm to $1.10^{20}$ Ohm/cm, and preferably $1.10^{15}$ Ohm/cm.

The sole 10 also exhibits insulating properties making it possible to approach very close to the rotating element 2 without generating the formation of electric arcs between the rotating element 2 and the sole 10, which could cause damage to the sole 10 or the rotating element 2 thereby causing disruptions in the functioning of the machine. In the example, the sole 10 is made from acetal resin by over-molding or adhesive bonding around the cage 3.

The guidance device is adapted so as to enable it to be integrated into a suction system comprising in particular a suction unit, on the understanding that said suction unit generates a sufficient flow to aspirate continuously the largest proportion of the dust produced by the rubbing between the brush and the rotating element, and preferably at least 80%.

In the illustrated example, the sole 10 exhibits the following external dimensions: 50 mm×50 mm for a height of between 10 mm and 20 mm. This sole is intended to surround a traditional brush exhibiting the following dimensions: 32 mm×32 mm×Y mm, the height Y being a variable element as a function of the wear of the brush 1. For the dimensions referred to here, a suction flow F of 15 m/s inside the sole 10 permits the aspiration of around 80% of the dust generated.

The suction system may be adapted, for example, to a generator comprising twelve brushes and their corresponding brush holders, each comprising a sole of the kind described above. In order to ensure the identical distribution of the suction flow between each sole, a flow diverter capable of distributing the flow is inserted between the suction unit and each sole. To illustrate the above example, the suction system could be itemized in the following manner:

a suction unit capable of generating a primary flow of at least 120 m³/s;
a flow diverter capable of dividing the primary flow into at least as many secondary flows as there are pipes to connect the soles, that is to say at least twelve outlets in our example;
one sole per brush holder;
pipes adapted to conveying the dust without loss of flow, thereby ensuring the connection between the suction unit, the flow diverter and the soles.

In order to obtain a better distribution of the flow F inside the sole, it is possible to envisage connecting each chamber to two pipes. The flow diverter in this case comprises twice as many outlets as there are soles.

The invention claimed is:

1. A guidance device for a suction system, said suction system being intended to suck up the dust generated by a brush rubbing against a rotating element in a rotary electrical machine, the guidance device being arranged in such a way as to concentrate a stream of air generated by the suction system, near an end of the brush that is in contact with the rotating element, the guidance device comprising an opening extending along a longitudinal axis defining a longitudinal direction, the opening configured to receive the brush and to guide the brush in the longitudinal direction, the guidance device further comprising at least one suction chamber having at least one elongated portion and a corresponding elongated opening that faces the rotating element when the guidance device is installed in the rotary electrical machine, the at least one suction chamber has a wall assembly extending in the longitudinal direction, said wall assembly being configured so as to surround part of the brush near the end of the brush;
    wherein the brush is slidably movable within the guidance device along the longitudinal direction so as to continue to rub against the rotating element as the brush wears against the rotating element when installed in the rotary electrical machine, and wherein the brush is made of a material that transmits electricity between the rotating element and a fixed element when installed in the rotary electrical machine.

2. The guidance device as claimed in claim 1, wherein the guidance device is fixedly joined to a cage surrounding the brush.

3. The guidance device as claimed in claim 2, wherein the guidance device is one piece with the cage.

4. The guidance device as claimed in claim 1, comprising at least one means for connecting to a pipe.

5. The guidance device as claimed in claim 4, wherein at least one of the suction chamber, the means of connection or the pipe is made from an antistatic material or is covered with an antistatic surface.

6. The guidance device as claimed in claim 1, comprising at least one pipe for connection to a suction unit.

7. The guidance device as claimed in claim 1, wherein at least one of the suction chamber, the means of connection or the pipe is made from an antistatic material or is covered with an antistatic surface.

8. The guidance device as claimed in claim 1, wherein the guidance device is made from a material that is electrically insulating and resistant to the heat generated by the operation of the machine.

9. The guidance device as claimed in claim 1, wherein the guidance device defines a plurality of suction chambers.

10. The guidance device as claimed in claim 1, wherein, among the walls of the suction chamber, at least one wall extends further from the side of the opening towards the rotating element than at least one other of said walls, such that, when said guidance device is installed around the part of the brush that is in contact with the rotating element, one of said walls remains above the end of the brush that is in contact with the rotating element in such a way as to permit the passage of said rotating element, and the other of said walls extends below the end of the brush that is in contact with the rotating element.

11. The guidance device as claimed in claim 1, in which the wall assembly comprises four flat walls fixedly joined one to the other, each of said walls being perpendicular to the adjacent walls.

12. A dust suction system comprising a suction unit and at least one guidance device according to claim 1.

13. The dust suction system as claimed in claim 11, comprising a flow diverter, a suction unit and a plurality of guidance devices including said at least one guidance device, the flow diverter assuring a connection and distribution of the stream of air between the suction unit and the guidance devices.

14. The guidance device as claimed in claim 1, wherein, when the guidance device is installed with the brush rubbing against the rotating element, at least one wall of the suction chamber extends radially beyond the end of the brush that rubs against the rotating element and beyond an outer circumference of the rotating element.

15. The guidance device as claimed in claim 1, wherein the suction chamber straddles the rotating element when the guidance device is installed in the rotary electrical machine.

16. The guidance device as claimed in claim 1, wherein the at least one elongated portion of the suction chamber extends in a plane orthogonal to the longitudinal axis.

17. A guidance device assembly, comprising:
- a brush configured to contact a rotating element in a rotary electrical machine;
- a brush opening in which the brush is received;
- a channel for suctioning dust generated by the brush, the channel has at least one elongated channel portion with a corresponding elongated channel opening that faces the rotating element when the device is installed in the rotary electrical machine with an end of the brush contacting the rotating element, and the at least one elongated channel portion is disposed along an outside of the brush so as to surround a least a part of the brush at or near the end of the brush; and
- wherein the brush is slidably movable within the brush opening along a longitudinal direction of the brush so as to continue to contact the rotating element as the brush wears against the rotating element when installed in the rotary electrical machine, and wherein the brush is made of a material that transmits electricity between the rotating element and a fixed element when installed in the rotary electrical machine.

18. The guidance device according to claim 17, wherein the brush opening extends around a longitudinal axis of the guidance device and the elongated channel opening extends in a plane that is generally orthogonal to the longitudinal axis.

19. The guidance device according to claim 17, wherein the channel is formed in a housing that supports the brush.

20. The guidance device according to claim 17, wherein an outer wall of the channel on one side of the brush extends beyond the end of the brush and beyond an outer wall of the channel on another side of the brush.

21. A rotary electrical machine comprising the guidance device according to claim 17, and wherein the rotary electrical machine is a motor or a generator.

\* \* \* \* \*